UNITED STATES PATENT OFFICE.

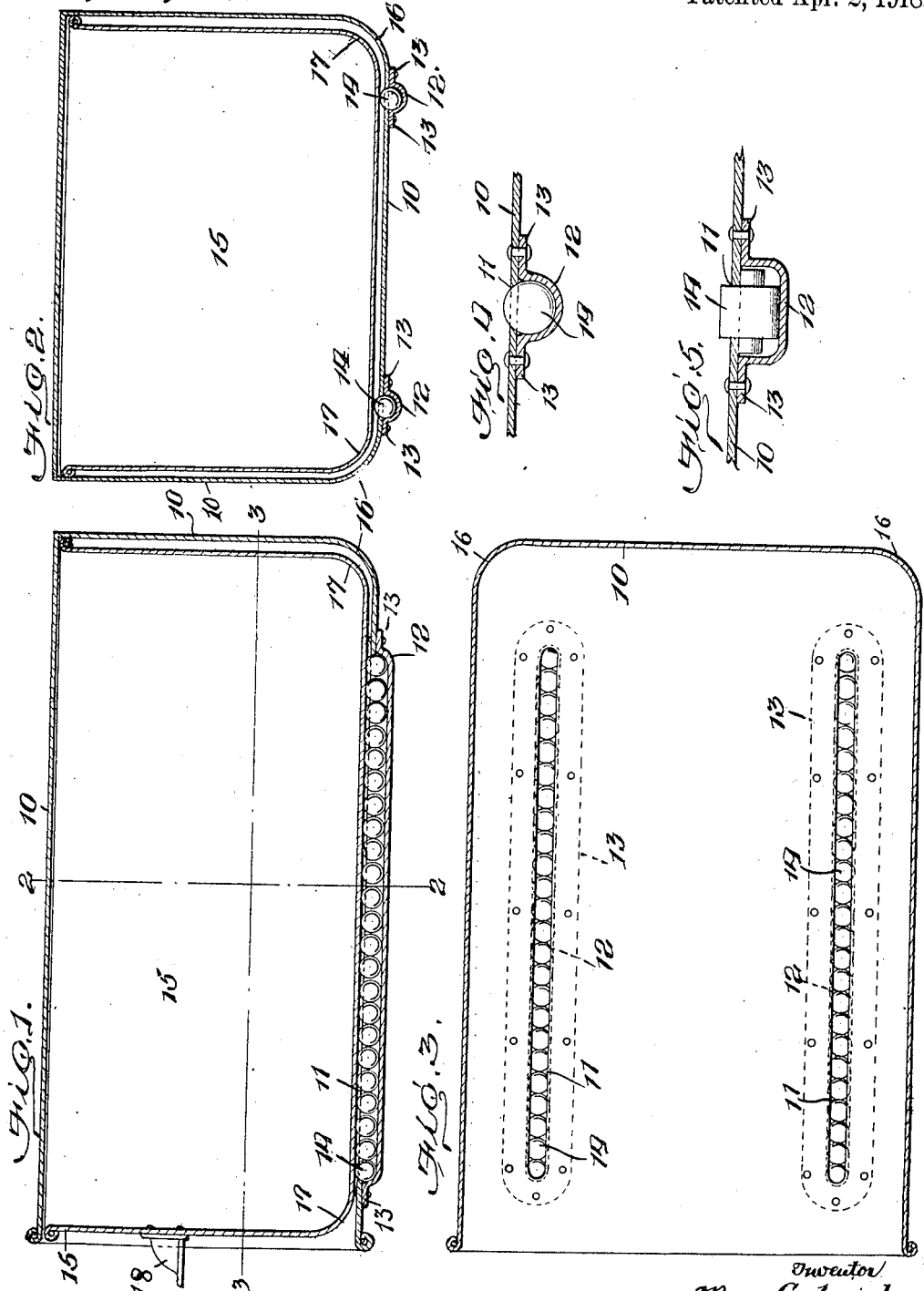

MARY GABRIEL, OF WATERBURY, CONNECTICUT.

BAKING AND ROASTING APPARATUS.

1,261,507.  Specification of Letters Patent.  Patented Apr. 2, 1918.

Application filed March 23, 1917. Serial No. 156,932.

*To all whom it may concern:*

Be it known that I, MARY GABRIEL, a citizen of the United States, residing at Waterbury, in the county of New Haven and State of Connecticut, have invented certain new and useful Improvements in Baking and Roasting Apparatus, of which the following is a specification.

This invention relates to improvements in baking and roasting devices, and has for one of its objects to improve the construction and increase the efficiency and utility of devices of this character.

Another object of the invention is to provide a device of this character including an outer shell or casing in which the pan which contains the articles of food is inserted, and from which the pan may be readily removed without disturbing the shell which is located within the oven or other heating apartment.

Another object of the invention is to provide a shell adapted to contain a baking pan and having antifriction balls or rollers to facilitate the insertion and removal of the pan.

With these and other objects in view, the invention consists in certain novel features of construction, as hereinafter shown and described and then specifically pointed out in the claims; and in the drawings illustrative of the preferred embodiment of the invention—

Figure 1 is a longitudinal sectional elevation of the improved device.

Fig. 2 is a transverse section on the line 2—2 of Fig. 1.

Fig. 3 is a plan view of the pan inclosing shell in section on the line 3—3 of Fig. 1.

Fig. 4 is an enlarged detail view of a portion of the bottom of the shell illustrating the manner of arranging and supporting the antifriction members.

Fig. 5 is a view similar to Fig. 4 illustrating a modification in the construction.

Corresponding and like parts are referred to in the following description and indicated in all the views of the drawings by the same reference characters.

Improved device comprises an outer shell or casing represented as a whole at 10, open at the front and closed at the bottom, sides and rear. The bottom of the shell is formed with two or more longitudinally directed slots indicated at 11 and with a trough shaped member 12 attached to the bottom of the shell beneath each slot. The member 12 is formed with laterally directed flanges 13 by which it is riveted or otherwise secured to the body of the shell adjacent to the slots.

The member 13 is wider than the slots 11, the latter thus overhanging the interior of the trough shaped member, as shown in Fig. 4. The member 12 forms a support for a plurality of antifriction balls 14 which project through the slots and above the upper face of the bottom of the shell, as shown in Figs. 1 and 2. The pan which is to contain the food to be cooked is represented as a whole at 15 and closely engages the interior of the shell and bears upon the upper faces of the balls 14. The balls thus form supports for the pan and enable it to be inserted into and withdrawn from the shell with the minimum of resistance. The sides and lower end of the rear of the shell are rounded, as represented at 16 to facilitate the manufacture, and the corners of the pan 15 are likewise rounded, as shown at 17, for the same purpose. The pan 15 is provided with a pull handle represented at 18. The top member of the shell 10 forms a practical closure to the pan when the latter is inserted, and the pan requires no other cover or closure. When the contents of the pan are to be inspected, the operator partly withdraws the pan by applying pulling force to the handle 18, and this can be done without exposing the operator to the steam or gases rising from the food being cooked.

The shell and pan may be of any required size and of any suitable material, but will preferably be constructed of the same grade of sheet metal of which ordinary baking pans are constructed.

The members 14 may be in the form of ordinary antifriction balls, as illustrated in Figs. 1 and 2, or in the form of rollers, as shown in Fig. 5.

Having thus described the invention, what is claimed as new is—

1. In an apparatus of the class described, a shell open at the front and including a bottom member, said bottom member having longitudinally directed openings, a trough shaped member beneath each of said openings and of greater width than the same whereby the side edges to the openings overhang the trough, and a plurality of antifriction elements within each of said troughs and of greater diameter than the openings and projecting partly therethrough to engage a container when inserted into the shell.

2. The combination in an apparatus of the class described of a shell open at the front and including a bottom member, said bottom member having longitudinally directed openings, a trough shaped member beneath each of said openings and of greater width than the same whereby the side edges to the openings overhang the troughs, a plurality of antifriction elements within each of said troughs and of greater diameter than the openings and projecting partly therethrough, and a container adapted to be inserted into said shell and engaging the antifriction openings.

3. An apparatus of the class described, comprising a shell open at the front and including top and bottom members, said bottom member having longitudinally directed openings, a trough shaped member beneath each of said openings and of greater width than the same whereby the side edges to the openings overhang the troughs, a plurality of antifriction elements within each of said troughs and of greater width than the openings and projecting partly therethrough, and a container open at the top and engaging in said shell and in engagement with and bearing upon said antifriction elements with the upper edge of the container in close proximity to the top of the shell whereby the top of the shell forms a closure for the container.

In testimony whereof I affix my signature.

MARY GABRIEL. [L. S.]

Copies of this patent may be obtained for five cents each, by addressing the "Commissioner of Patents, Washington, D. C."